April 25, 1939. W. F. GROENE ET AL 2,156,153
MULTIPLE SPINDLE VERTICAL CRANKSHAFT LATHE
Filed April 8, 1937 13 Sheets-Sheet 1
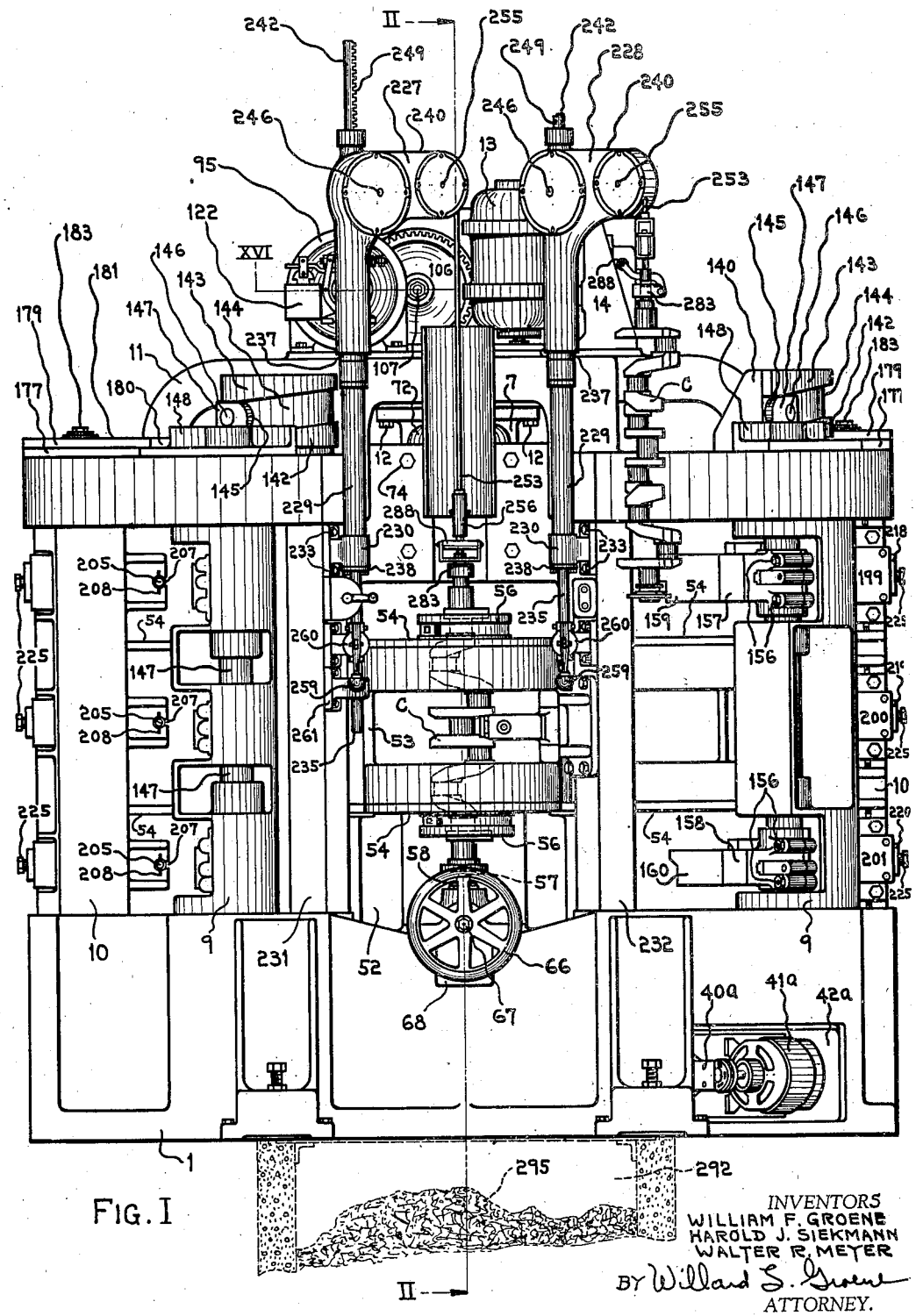
FIG. I
INVENTORS
WILLIAM F. GROENE
HAROLD J. SIEKMANN
WALTER R. MEYER
BY Willard S. Groene
ATTORNEY.

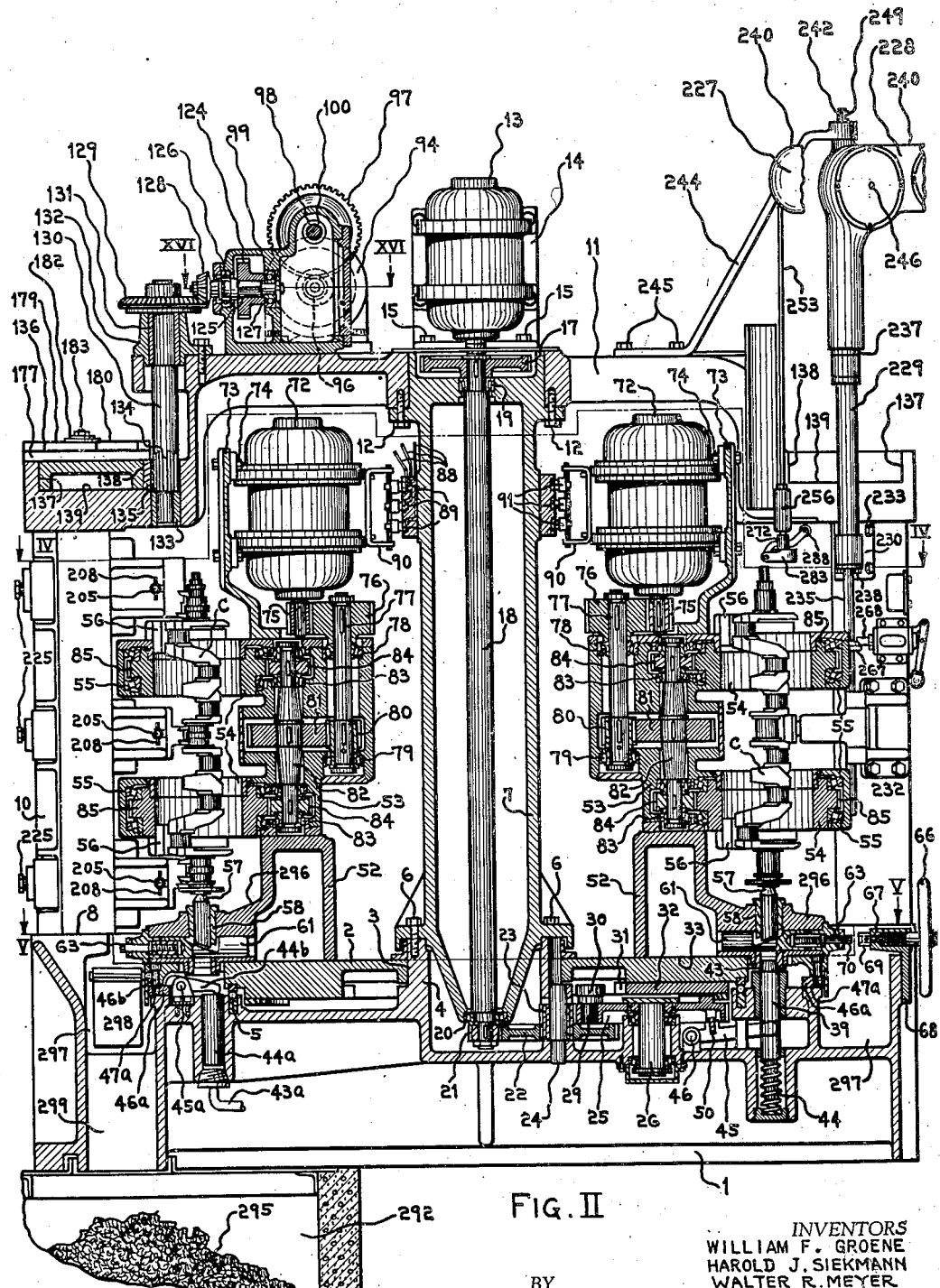
FIG. II
INVENTORS
WILLIAM F. GROENE
HAROLD J. SIEKMANN
WALTER R. MEYER
BY Willard S. Groene
ATTORNEY.

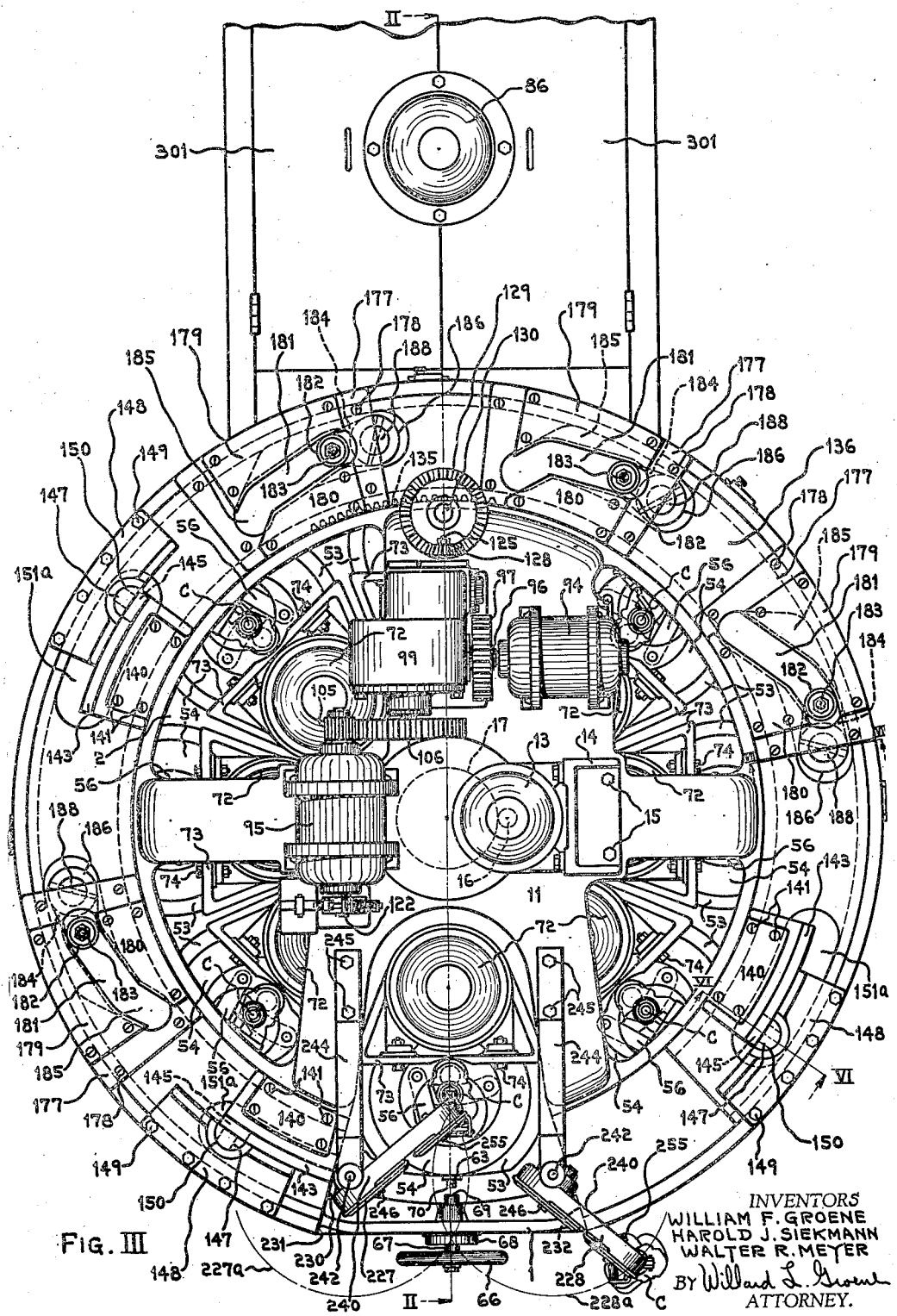

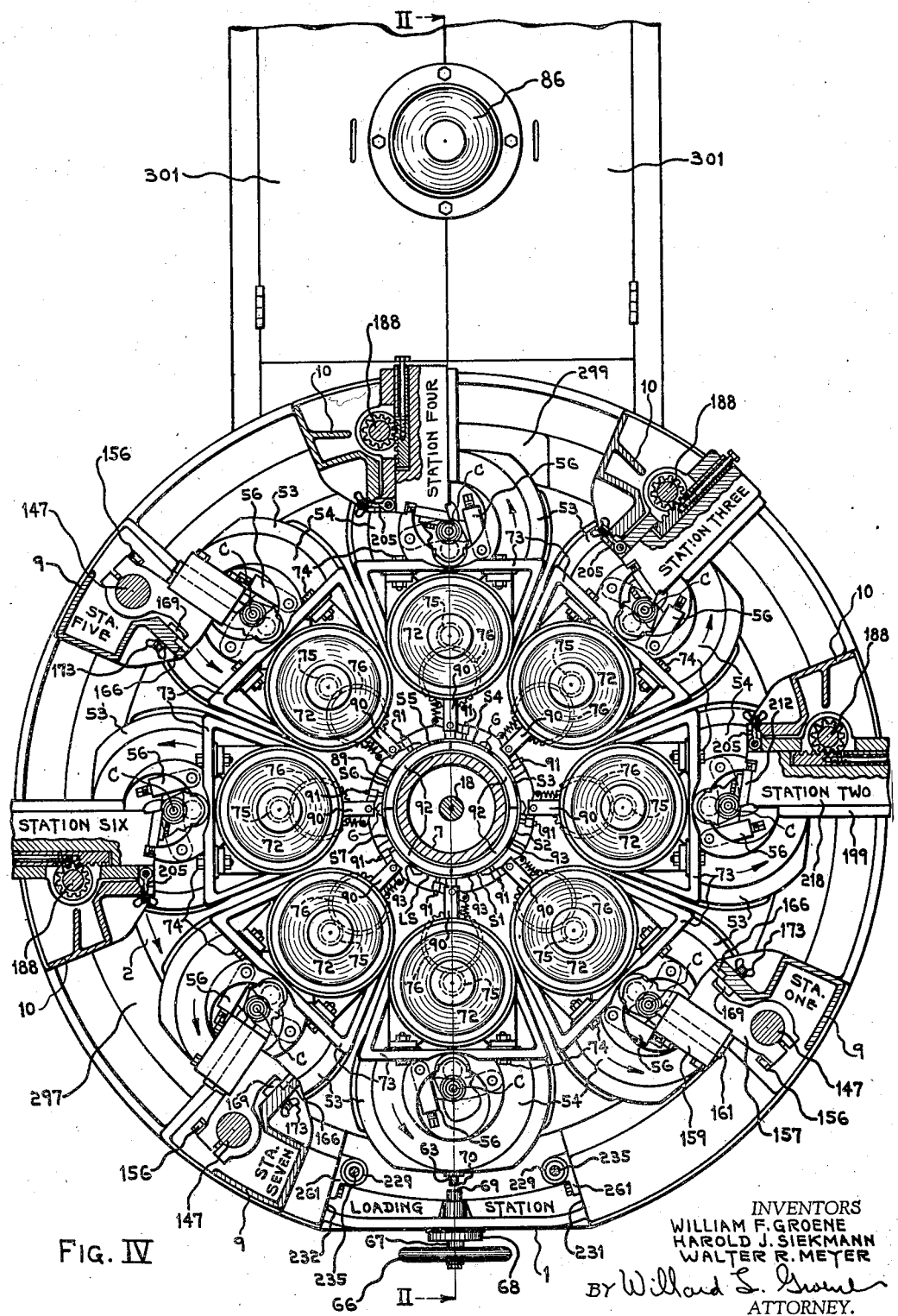

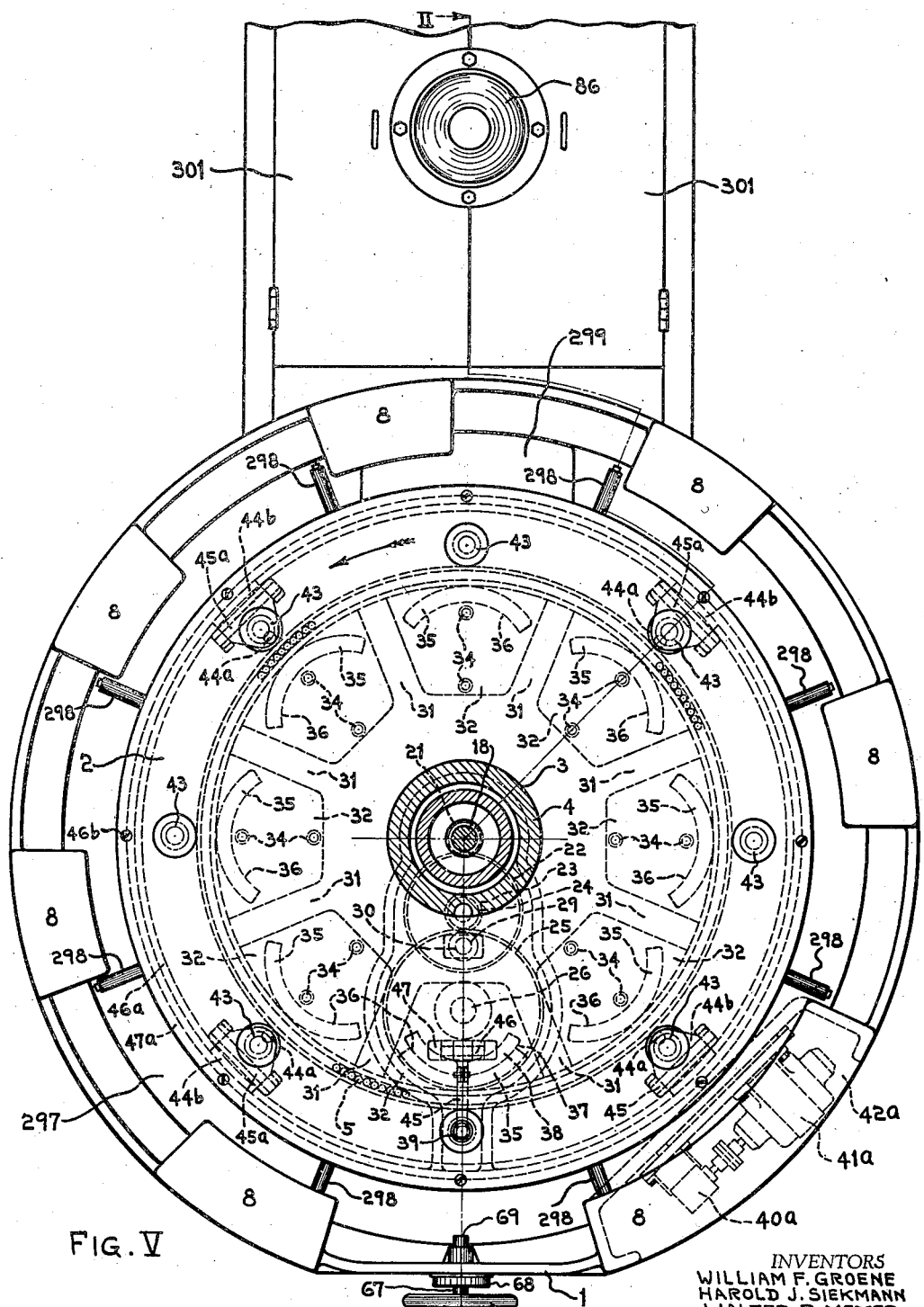
FIG. V

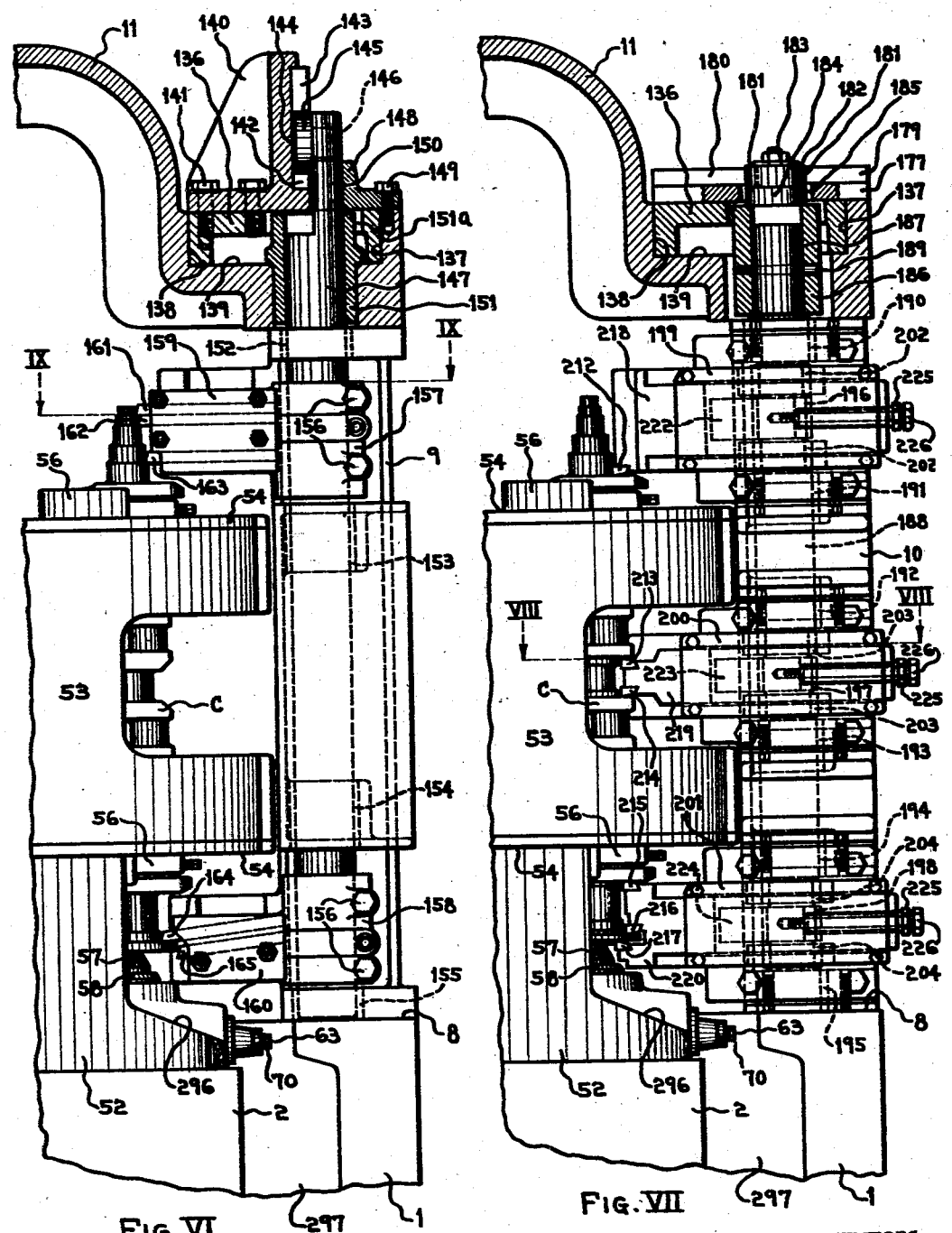

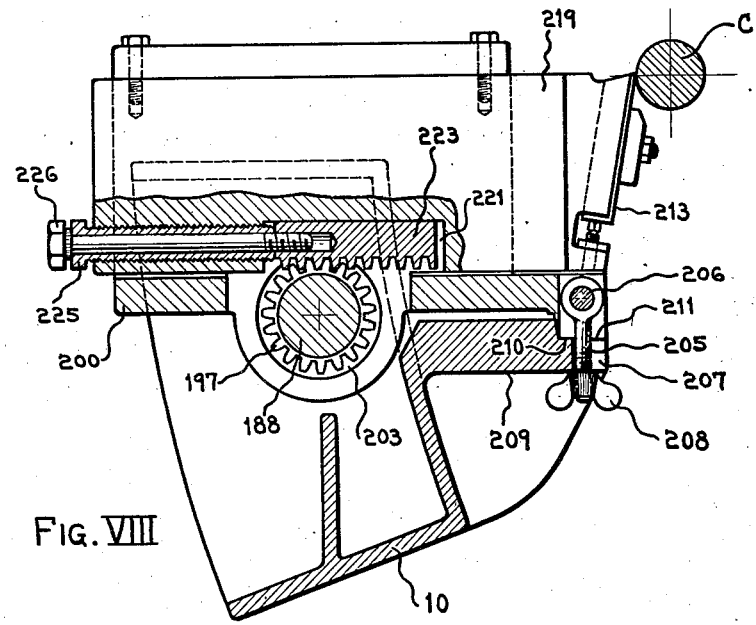
Fig. VIII
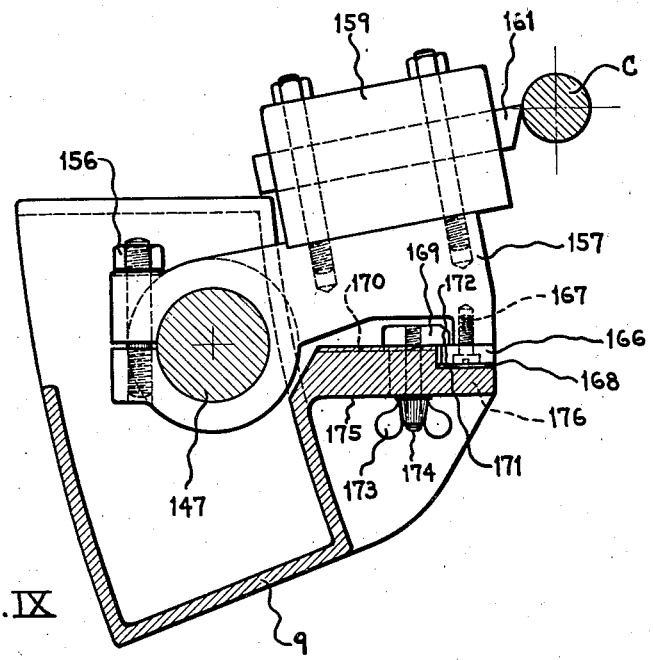
Fig. IX
INVENTORS
WILLIAM F. GROENE
HAROLD J. SIEKMANN
WALTER R. MEYER
BY
ATTORNEY.

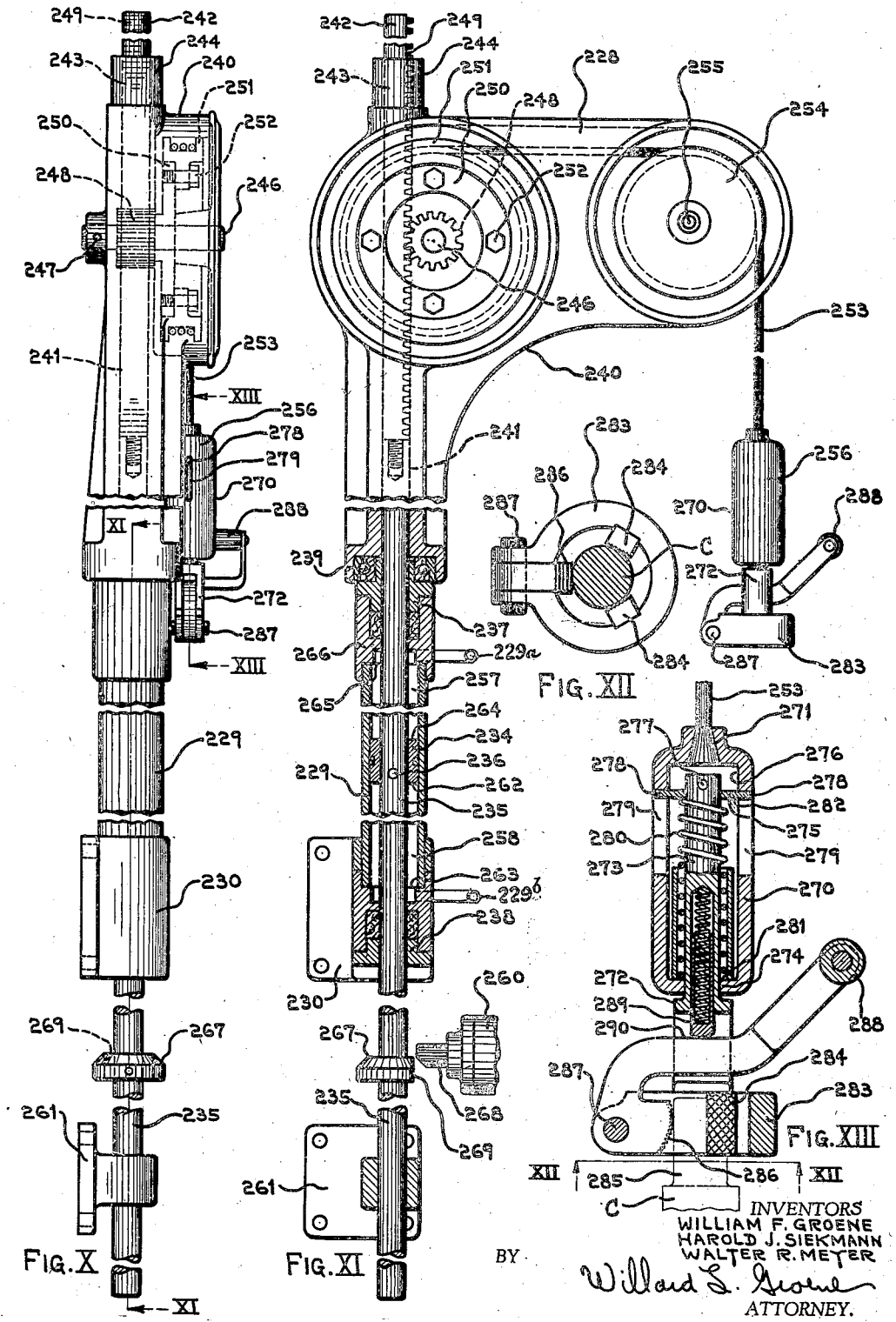

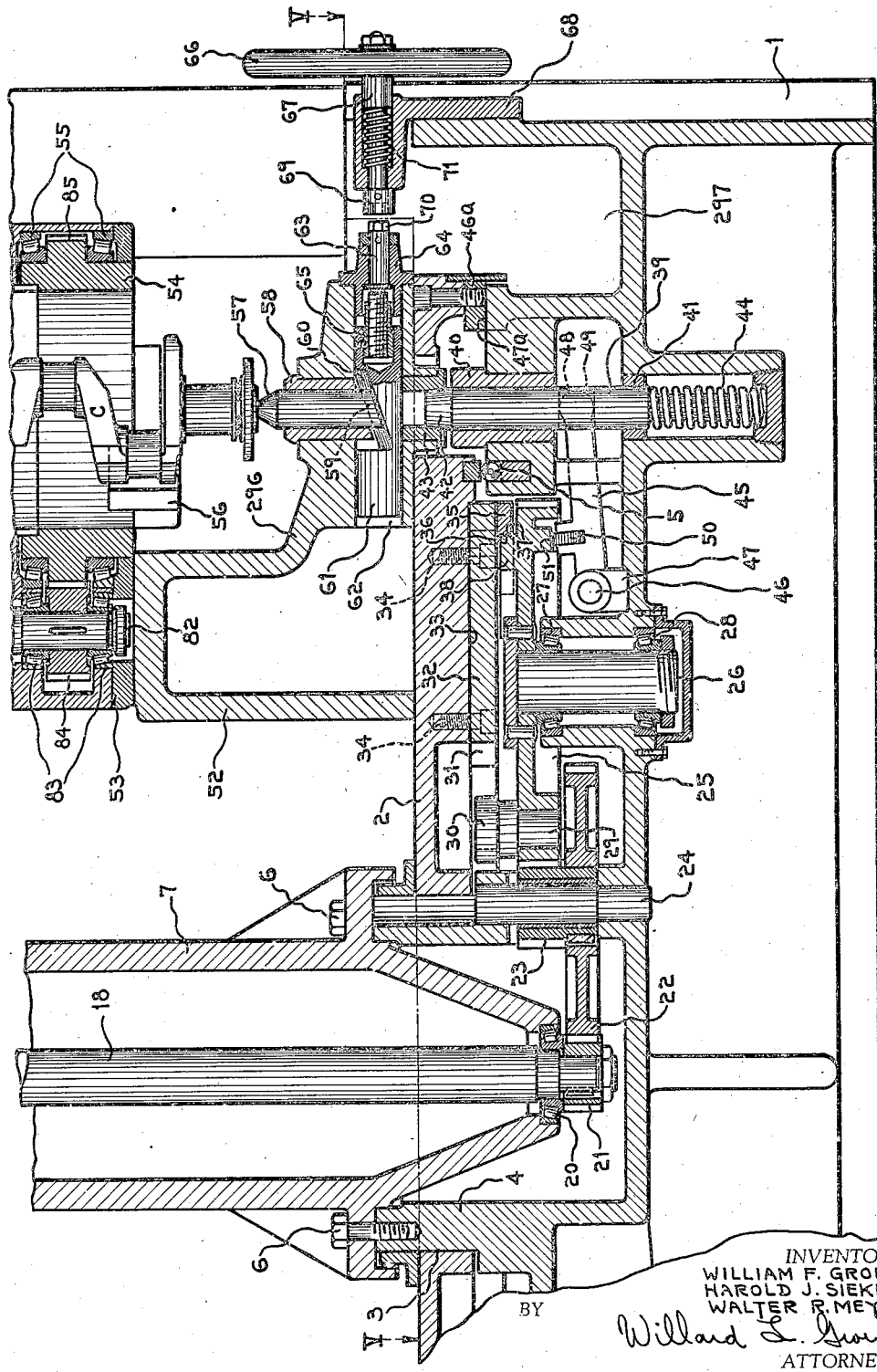

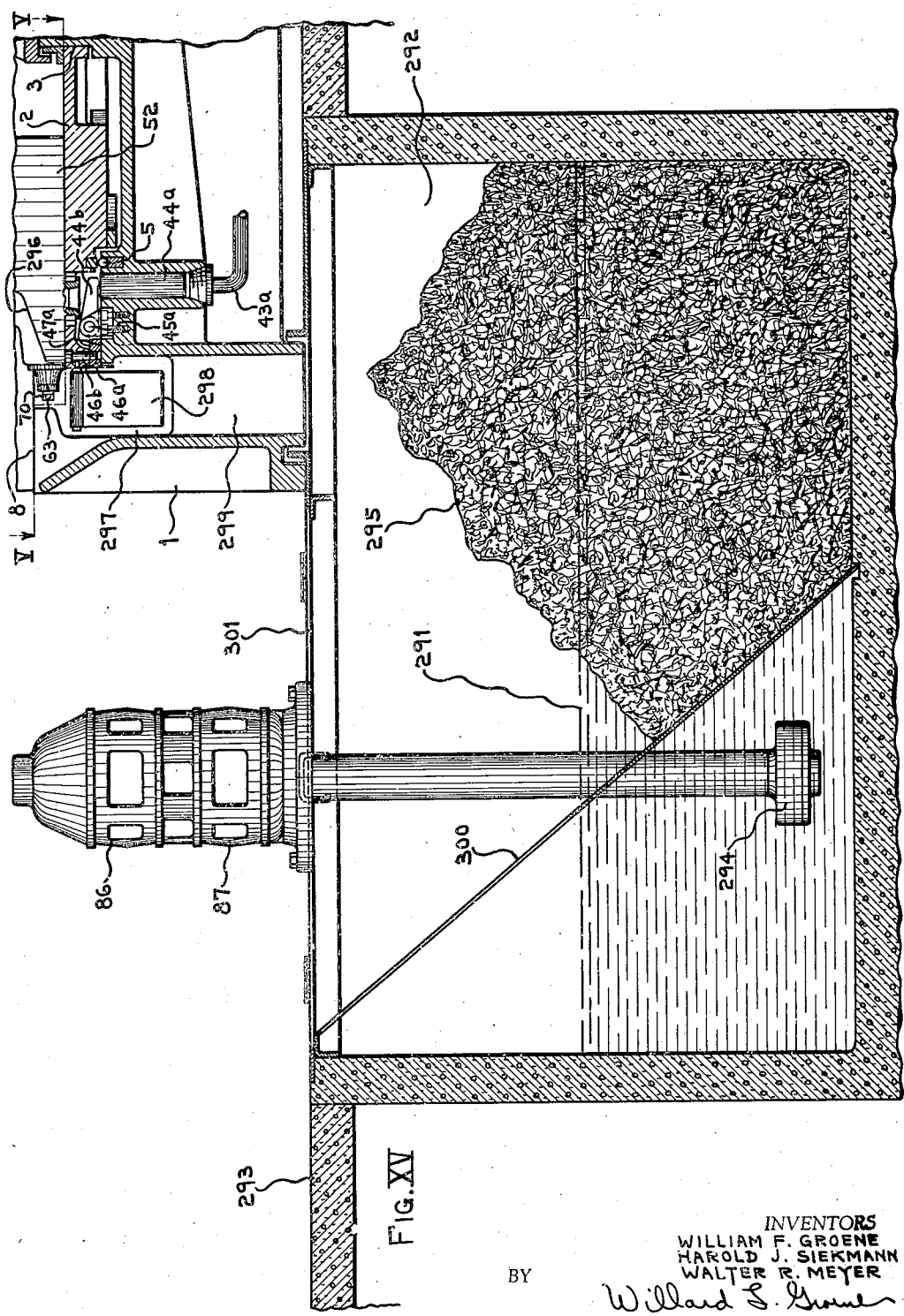

April 25, 1939. W. F. GROENE ET AL 2,156,153
MULTIPLE SPINDLE VERTICAL CRANKSHAFT LATHE
Filed April 8, 1937 13 Sheets-Sheet 11
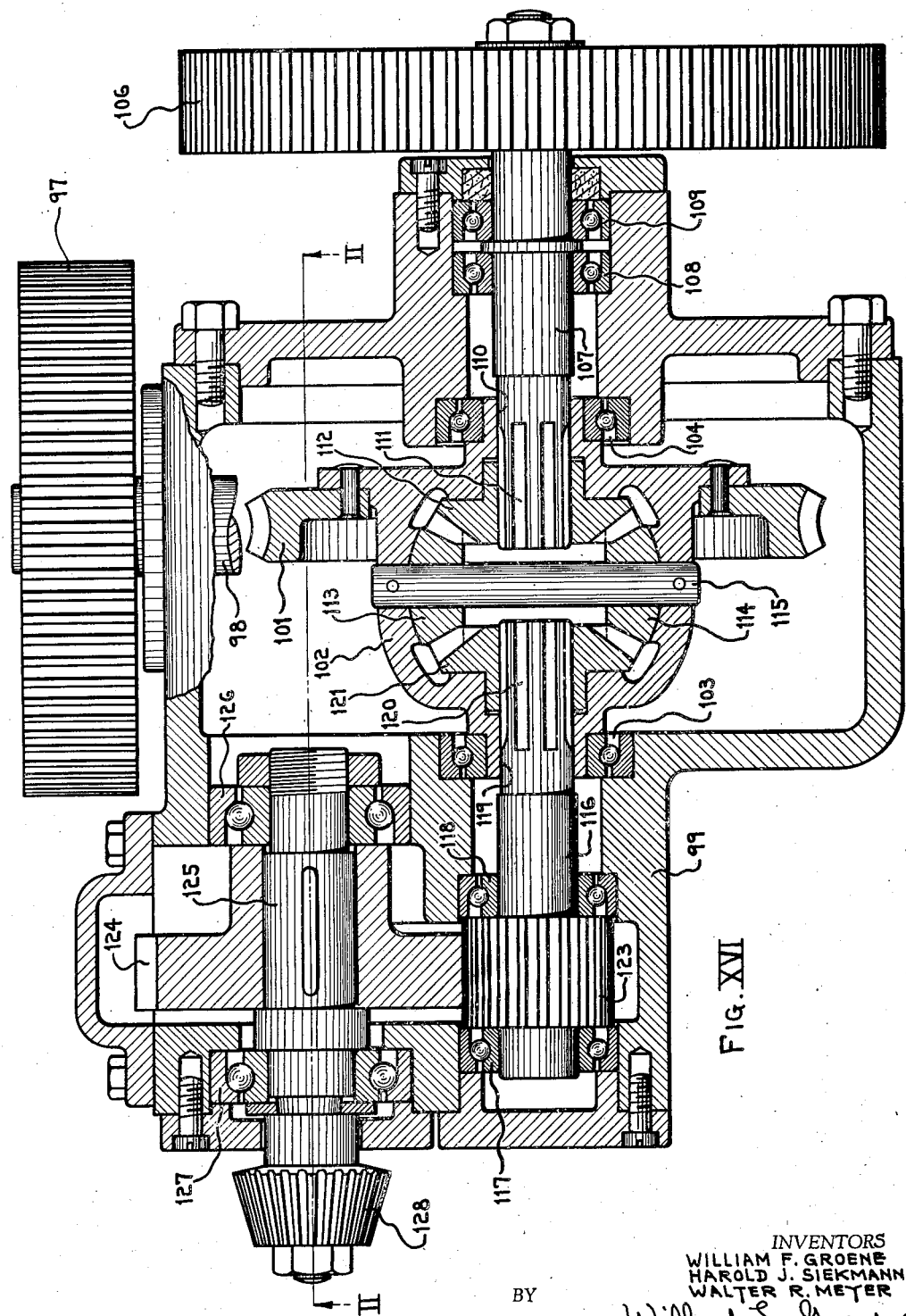
Fig. XVI
INVENTORS
WILLIAM F. GROENE
HAROLD J. SIEKMANN
WALTER R. MEYER
BY Willard L. Groene
ATTORNEY.

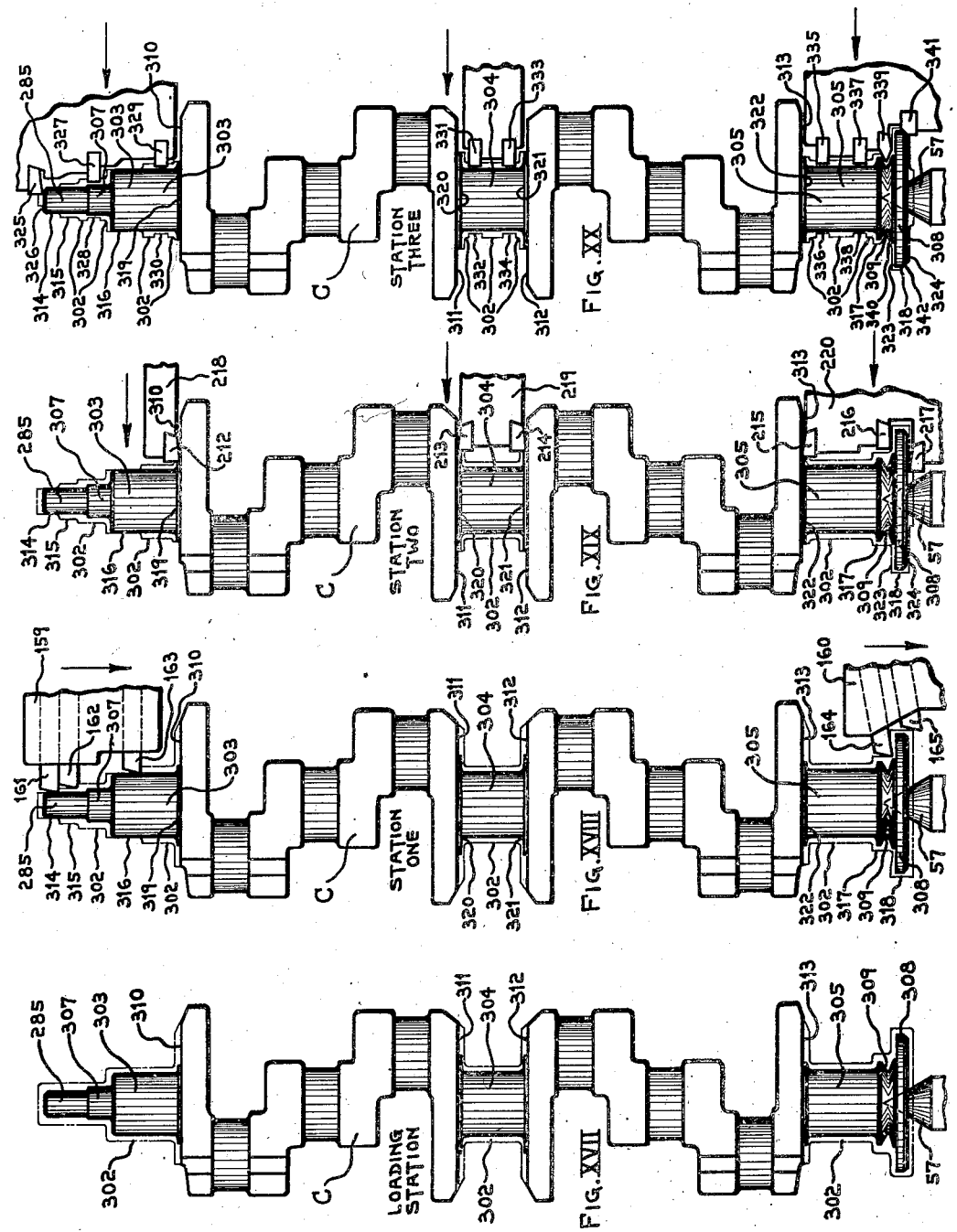

April 25, 1939.     W. F. GROENE ET AL     2,156,153
MULTIPLE SPINDLE VERTICAL CRANKSHAFT LATHE
Filed April 8, 1937     13 Sheets-Sheet 13
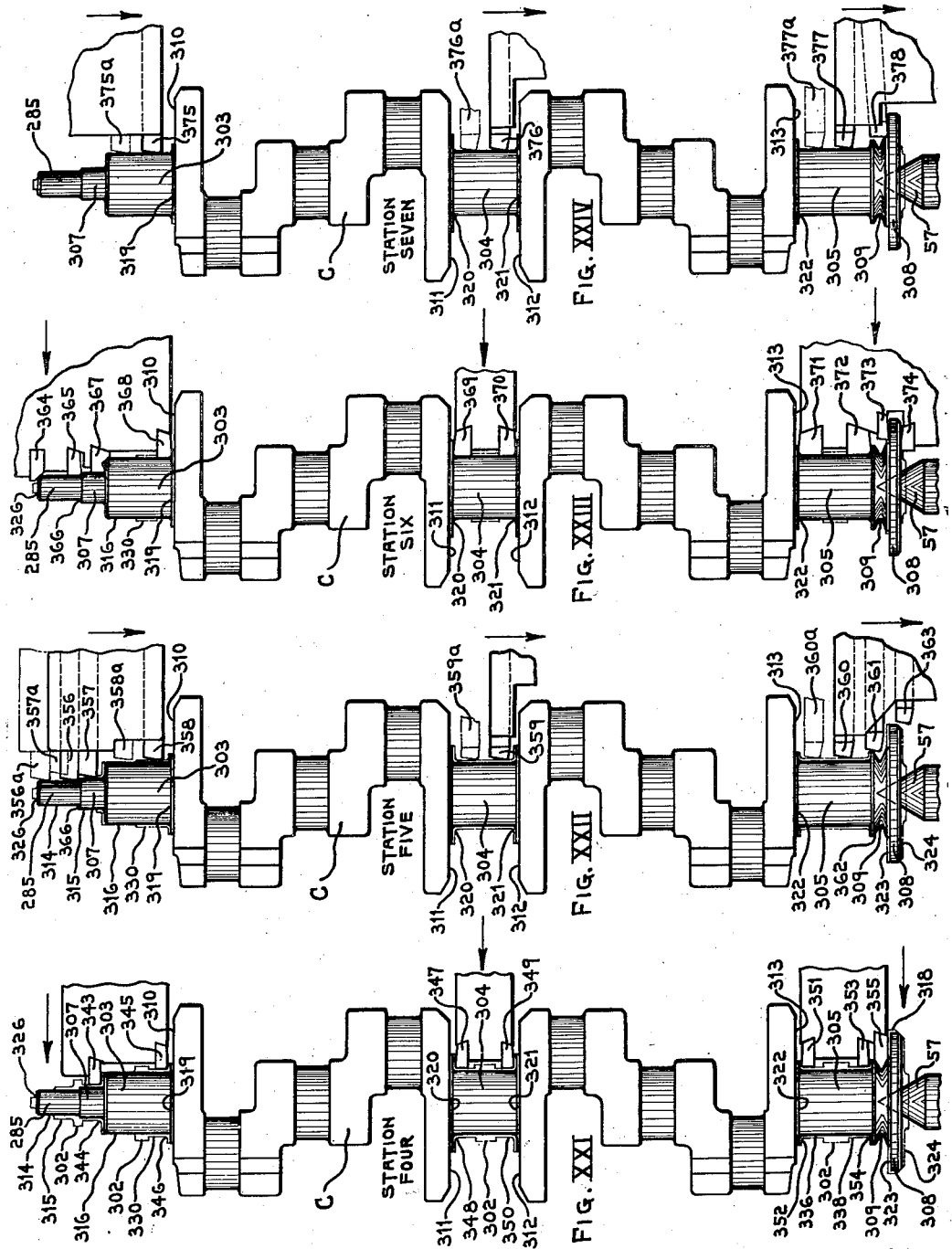
INVENTORS
WILLIAM F. GROENE
HAROLD J. SIEKMANN
WALTER R. MEYER
BY Willard S. Growe
ATTORNEY.

Patented Apr. 25, 1939

2,156,153

UNITED STATES PATENT OFFICE

2,156,153

MULTIPLE SPINDLE VERTICAL CRANK-SHAFT LATHE

William F. Groene, Harold J. Siekmann, and Walter R. Meyer, Cincinnati, Ohio, assignors to The R. K. Le Blond Machine Tool Company, Cincinnati, Ohio, a corporation of Delaware Application April 8, 1937, Serial No. 135,740

52 Claims. (Cl. 29—38)

This invention pertains to multiple spindle crankshaft lathes, more particularly to crankshaft lathes of a character adapted to machining the line bearings and associated portions of crankshafts.

Our invention consists in certain new and useful improvements, modifications, and additions to multiple spindle lathes of a character set forth in the copending application of William F. Groene and Walter R. Meyer, Serial Number 80.204 filed May 16, 1936.

The chief object of this improved machine is to provide a relatively large number of work stations to more efficiently rough and finish turn the line bearings and associated surfaces of crankshafts while at the same time providing a highly practical machine from the standpoint of access to the cutting tools, of loading and unloading of work in the lathe, of disposal of the chips, and of distributing the cutting forces more evenly over all the work stations.

An object of our invention is to provide in a lathe a series of vertically arranged center drive work spindles mounted on an indexing carrier in which spindles crankshafts may be chucked and rotated and successively presented to a series of work stations at which cutting tools are applied to the crankshafts to progressively machine the line bearings and associated surfaces thereof.

Another object is to provide in a lathe a series of work spindles, mounted on an indexing carrier, which are each driven by an independent source of power.

Another object is to provide in a lathe a series of work spindles, mounted on an indexing carrier, which are at all times rotating under power, except at the loading or unloading station, at predetermined different rates of speed for each work station.

Another object is to provide in a lathe a series of work spindles mounted on an indexing carrier, some of said spindles being operable at predetermined different rates of speed while all of said spindles maintain rotation except when at the loading and unloading station.

Another object is to provide in a lathe a series of work spindles mounted on an indexing carrier some of said spindles being operable at predetermined different rates of speed while others of said spindles are operable at variable rates of speed.

It is also our intention to provide unique mechanism for vertically loading and unloading work in the center drive work spindles.

A unique means is also provided for gathering the chips from all of the work stations and depositing them in an appropriate chamber under the base of the machine for quick and easy removal.

Another feature is to arrange the cutting tool holders at the various work stations so that they may be readily moved from cutting position away from the work for access to the cutting tools.

A further feature is to provide a combined motor, frequency changer, and coolant pump for operating the lathe.

Other objects and features of our invention will appear from the following detailed description of the drawings in which:

Figure I is a front elevation of the machine particularly showing the loading station and the loading and unloading devices associated therewith.

Figure II is a view, partly in section on line II—II of Figures I, III, IV, V, and XVI.

Figure III is a plan view of the top of the machine particularly showing the tool feeding mechanism.

Figure IV is a plan view, partly in section on line IV—IV of Figure II, particularly showing the indexing carrier, the work spindles, and associated work stations.

Figure V is a plan view, partly in section on line V—V of Figures II, XIV, and XV, particularly showing the indexing carrier, and associated indexing mechanism.

Figure VI is an elevation, partly in section on line VI—VI of Figure III particularly showing the turning tools of work station one.

Figure VII is an elevation, partly in section on line VII—VII of Figure III, particularly showing the forming tools of work station two.

Figure VIII is a plan view partly in section on line VIII—VIII of Figure VII, partly broken away to more clearly show the means for feeding and adjusting the forming tools relative to the work.

Figure IX is a plan view partly in section on line IX—IX of Figure VI.

Figure X is an elevation of one of the loading and unloading devices associated with the loading station.

Figure XI is a view partly in section on line XI—XI of Figure X.

Figure XII is a view partly in section on the line XII—XII of Figure XIII.

Figure XIII is a view partly in section on the line XIII—XIII of Figure X.

Figure XIV is an enlarged view of a portion of Figure II to more clearly show the indexing mechanism for the indexing carrier.

Figure XV is an enlarged view partly in section on the line II—II of Figures I, III, IV, and V particularly showing the chip receiving compartment under the base of the machine and the combined motor, frequency changer, and coolant pump.

Figure XVI is a view partly in section on line XVI—XVI of Figures I and II showing the differential drive mechanism for feeding and rapid traversing the cutting tools.

Figure XVII shows a crankshaft at the loading station.

Figure XVIII shows the application of turning tools to a crankshaft at work station one.

Figure XIX shows the application of forming tools to a crankshaft at work station two.

Figure XX shows the application of forming tools to a crankshaft at work station three.

Figure XXI shows the application of forming tools to a crankshaft at work station four.

Figure XXII shows the application of turning tools to a crankshaft at work station five.

Figure XXIII shows the application of forming tools to a crankshaft at work station six.

Figure XXIV shows the application of turning tools to a crankshaft at work station seven.

Indexing carrier

The machine has a circular base 1 upon which is rotatably mounted the indexing carrier 2 journaled about the bearing portion 3 of the upstanding central boss 4 of the base 1 and supported on an appropriate anti-friction thrust bearing 5 mounted on the base 1. Note Figures I, II, III, IV, V, and XIV. Fixed to the boss 4 by suitable screws 6 is the central column 7. Mounted on appropriate pads 8 spaced around the periphery of the base 1, Figure V, is a series of tool holder frames 9 and 10, Figure IV. An upper housing 11 is fixed to the column 7 by bolts 12 and is also supported on the upper ends of the frames 9 and 10 and securely fixed thereto by appropriate means to give the necessary rigidity to said frames.

Power for operating the mechanism for indexing the carrier 2 is derived from the electric motor 13 mounted on the bracket 14 fixed to the housing 11 by the bolts 15, Figure III. The motor pinion 16 of the motor 13 drives the gear 17 fixed on the drive shaft 18 journaled in the anti-friction bearings 19 and 20 in the column 7. Fixed to the lower end of the shaft 18, Figure XIV, is the pinion 21 which drives the gear 22 of the compound gear 22—23 journaled on the stud 24 fixed in the base 1. The gear 23 of the compound gear 22—23 drives the indexing gear 25 which is fixed to the shaft 26 journaled on anti-friction bearings 27 and 28 in the base 1. On the stud 29 fixed in the gear 25 is mounted a roller 30 which is adapted to nicely fit in the indexing slots 31 formed by the segmentary pieces 32 fixed to the underside 33 of the indexing carrier 2 by the screws 34, Figure V. On each of the pieces 32 is formed an arcuate boss 35 having a concave surface 36 which is nicely engaged by the convex surface 37 of an arcuate boss 38 formed on the gear 25 when said carrier is in an indexed position. It can thus be seen that upon rotation of the gear 25 by energizing the motor 13 the roller 30 (Figure V) will be moved into a slot 31 at which instant the surfaces 36 and 37 of the arcuate bosses 35 and 38 become disengaged. Continued rotation of the gear 25 moves the roller 30 which is entered in a slot 31 so as to cause rotation of the carrier 2 from one indexed position to the next indexed position. Just as the roller 30 again leaves the slot 31 the surfaces 36 and 37 again reengage and remain so during a substantial portion of the rotation of the gear 25, the purpose of the engagement of said surfaces 36 and 37 being to bring the carrier to substantially accurate indexed position without requiring the motor 13 to be accurately stopped to accomplish this result.

Means are provided to bring the carrier 2 into precise indexed position after it is approximately indexed by the surfaces 36 and 37 of the arcuate bosses 35 and 38, comprising an indexing plunger 39 axially slidable in bushings 40 and 41 fixed in the base 1 which has a tapered end portion 42 which is normally urged into engagement with a mating tapered bore of the indexing bushings 43 fixed in the carrier 2 by means of an appropriately mounted spring 44. A lever 45, pivotally mounted on a stud 46 in the bracket 47 fixed on the base 1, has a rounded end portion 48 fitted in an appropriate transverse slot 49 in the plunger 39 and a roller 50 mounted thereon which is engaged by a cam surface 51 on the gear 25. The cam surface 51 is so arranged on the gear 25 that upon rotation of the gear the plunger will be held withdrawn during the time the roller 30 is moving the carrier 2 and the surfaces 36 and 37 are disengaged and to permit engagement of the plunger 39 in the bush 43 by spring 44 when the surfaces 36 and 37 are engaged and the roller 30 ineffective to move the carrier.

Fluid pressure operated clamping mechanism is provided to hold the indexing carrier securely on the base 1 when in indexed position. Fluid pressure derived from the pump 40a driven by the motor 41a mounted in the cavity 42a in the base 1 of the lathe is delivered to line 43a to upwardly urge the plunger pistons 44a mounted in the base 1, the upper ends of which pistons contact the pivoting clamps 44b mounted on the pins 45a suitably fixed on the base 1 to thereby cause the annular clamping ring 46a fixed on the carrier 2 by screws 46b to be firmly held against the annular surface 47a of the base 1 thus securely holding the carrier 2 on the base 1 against relative rotation when in indexed position.

Center drive work spindles

On the indexing carrier 2 is mounted a series of pedestals 52 upon which are mounted the center drive chuck housings 53, Figures II, IV, and XIV, which carry the center drive ring gears 54 suitably journaled on anti-friction bearings 55. The ring gears 54, two for each work spindle as shown in this exemplary disclosure, each have chucking devices 56 for gripping a crankshaft C in a manner preferably as shown in Patents Re. 19,905, Re. 20,090, or 2,030,020.

Means are provided for properly axially positioning the crankshaft C in said chucking devices 56 comprising a center pin 57, Figure XIV, axially slideable in bushing 58 fixed in the pedestal 52. The lower end of the center pin 57 has an inclined concave surface 59 adapted to abut against the inclined convex surface 60 on the plunger 61 axially slideable in the bore 62 in the pedestal 52, the structure of surfaces 59 and 60 being such as to prevent rotation of the center pin 59 upon rotation of the crank shaft C. The center pin 57 may be moved axially upward by moving the plunger 61 radially toward the center of rotation of the carrier 2 by rotating the screw 63 rotatably mounted against axial movement in the bracket 64 fixed to the pedestal 52, which screw 63 is appropriately threaded in the nut 65 fixed in the plunger 61. The center pin 57 may be returned axially downward by withdrawing the plunger 61 radially outward of the carrier 2 aided by gravity and the weight of the crankshaft C when unclamped in the chucking devices 56.

A hand-wheel 66 mounted on the rotatable and axially slideable shaft 67 in the bracket 68 fixed to the base 1 at the loading station provides manual means for rotating screw 63 by moving the shaft 67 axially to engage the socket end 69 over the flatted end portion 70 of the screw 63 and rotating the hand wheel 66. A spring 71 appropriately mounted in the bracket 68 serves to automatically disengage the socket end 69 and portion 70 of the screw 63 when the hand wheel 66 is released to prevent damage to the lathe upon indexing of the carrier 2.

The ring gears 54 for each work spindle are driven from a motor 72, Figures II and IV, mounted on the bracket 73 by bolts 74 which bracket 73 in turn is fixed on the center drive chuck housing 53. The motor pinion 75 drives the gear 76 fixed on the shaft 77 journaled on anti-friction bearings 78 and 79 in the housing 53. Fixed on the shaft 77 is a pinion 80 adapted to drive the gear 81 fixed on the shaft 82 journaled on anti-friction bearings 83 in housing 53. Fixed on the shaft 82 are like pinions 84 which drive the like gear portions 85 of the ring gears 54 whereby said ring gears for each work spindle may be rotated in synchronism by the motor 72.

One method of energizing the motors 72 is to provide a frequency changer 86, Figure XV, driven by a constant speed motor 87. The frequency changer 86 is electrically connected by appropriate wiring to the taps 88, Figure II, of the collector rings 89 fixed to and surrounding the column 7. On each of the driving motors 72 is mounted a suitable brush carrier 90 properly holding the current collecting brushes 91 in contact with the collector rings 89 so that power may be delivered from the frequency changer 86 to the motors 72.

Noting Figure IV, the collector rings 89 comprise a series of segments LS, S1, S2, S3, S4, S5, S6, and S7, which are attached to suitable insulating material 92 mounted on the column 7 and separated by insulating portions 93 forming part of the contact surface of the collector rings 89. The segment LS is normally de-energized except when dynamically braking for accurate stopping or "inching" a work spindle at the loading station to facilitate manipulation of the chucking devices 56.

One form of operation is to have all of the segments S1 to S7, inclusive, connected to the frequency changer 86 whereby all of said motors may be continuously operated except when the brushes 91 are contacting the normally de-energized segment LS for the work spindle in the loading station. Passage of the brushes 91 across the insulating portions 93 during indexing is so rapid as to preclude any appreciable slowing down of the motors 72 and work spindles. Various different frequencies may be simultaneously selected for all the segments S1 to S7, inclusive, from the frequency changer 86 in the usual manner of selecting the proper poles of the frequency changer 86, whereby all of said work spindles may be simultaneously rotated at a plurality of predetermined different speeds.

Another form of operation is to have each of the segments S1 to S7, inclusive, energized with a different frequency from the frequency changer 86 whereby predetermined different speeds may be provided for the work spindles at the work stations. For example, segments S1, S5, and S7 may be so energized as to cause rapid rotation of motors 72 and their associated work spindles when at the respective work stations one, five, and seven; segment S2 may be so energized as to cause the work spindles at work station two to rotate less rapidly; and segments S3, S4, and S6 may be so energized as to cause the work spindles at work stations three, four, and five to rotate relatively slowly. By this arrangement proper spindle speeds may be automatically provided for each type of machining operation undertaken at each work station by the indexing of the carrier 2.

Still another arrangement would be to have certain of the segments, as for instance the segment S2, supplied from a source of power which would cause a motor 72 connected thereto to operate at variable rates of speed controlled by the movement of the tool feeding devices associated with said station, for example in a manner fully set forth in the co-pending application of William F. Groene, Serial Number 122,349, filed January 26, 1937. Thus variable spindle speeds may be provided for the work spindles at any work station requiring such variable speeds for work of greatly varying diameter, as when checking the webs of a crankshaft.

Tool feeding mechanism

Power for actuating the tool feeding mechanism is derived from the feed drive motor 94 and the reversible rapid traverse drive motor 95 mounted on the upper housing 11, Figure III. Both of said motors are connected to a differential gearing particularly shown in Figures II and XVI. The feed drive motor 94 has a pinion 96 adapted to drive the gear 97 fixed on the worm shaft 98 which is suitably journaled in the differential gear case 99. A worm 100 formed on the shaft 98 is adapted to drive the worm wheel 101 suitably mounted on the differential cage 102 journaled in appropriate anti-friction bearings 103 and 104 in the gear case 99. The motor 94 is operated during the forward movement of the cutting tools to the work during which time the motor 94 relatively slowly rotates the worm wheel 101 and cage 102. When the motor 94 is stopped the cage is held against rotation by the locking effect of the worm 100 and worm wheel 101 combination which also prevents the cage 102 from being rotated at a speed different from the speed at which it is being rotated by the motor 94.

The reversible rapid traverse motor 95 has a pinion 105 which drives the gear 106 fixed on the shaft 107 journaled on the anti-friction bearings 108 and 109 in the gear case 99 and in the bore 110 of the cage 102. On the splined end portion 111 of the shaft 107 is mounted a bevel gear 112 adapted to drivingly engage the bevel pinions 113 and 114 journaled on the driving pin 115 fixed in the cage 102. A shaft 116 journaled on anti-friction bearings 117 and 118 in the gear case 99 and in the bore 119 of the cage 102. On the splined end portion 120 of the shaft 116 is mounted the bevel gear 121 also adapted to engage the bevel pinions 113 and 114. Associated with the reversible rapid traverse motor 95 is a solenoid operated brake 122 for rapid stopping of said motor when rapid traversing the tools to or from the work. The brake 122 further serves to assure non-rotation of the traverse motor 95 when the tools are being actuated in feeding motion by motor 94.

When rapid traverse is desired in either direction the motor 95 is operated in either direction to cause the shaft 107 to be rotated at relatively high speed. In instances where the feed drive motor is not operating during rapid traverse, the cage 102 will be held stationary, the bevel gear 112 which is rotated by shaft 107 will rotate the bevel pinions 113 and 144 on pin 115, which pinions in turn will cause rotation of bevel gear 121 and its shaft 116 at the same speed as the shaft 107, but in reverse direction, to thereby cause rapid rotation of shaft 116 for rapid traverse purposes.

In instances where the feed motor 94 is operating during rapid traverse, there will be a slight increase or decrease in the rapid traverse speed of shaft 116 relative to shaft 107 by the addition or subtraction of the speed of rotation of the cage 102 caused by the feed motor. However, because of the relatively slow speed of rotation of the cage 102 no appreciable effect on the proper functioning of the rapid traverse speed will result so that the feed and rapid traverse motors may be operated either simultaneously or independently without damage to the lathe mechanism or its proper operation.

When it is desired to cause feeding for the cutting tools of the lathe, the shaft 107 and the bevel gear 112 are held from rotation by applying the brake 122 to prevent rotation of the motor 95. The cage 102, being rotated slowly by the motor 94, carries the bevel pinions 113 and 114 on the pin 115 about the bevel gear 112 thereby causing said pinions 113 and 114 to revolve on the pin 115 which motion in turn causes the pinions to drive the bevel gear 121 and the shaft 120 at relatively slow speed for feeding purposes.

Power from the shaft 116 is transmitted by the pinion 123 formed on the shaft 116 which drives the gear 124 fixed on the shaft 125 journaled on anti-friction bearings 126 and 127 in the gear case 99. On the shaft 125 is fixed the bevel pinion 128 which drives the bevel gear 129 fixed on the vertical shaft 130 journaled in the bearing 131 in the bracket 132 fixed to upper housing 11 and in the bearing 133 in said housing 11. Formed on the shaft 130 adjacent the bearing 133 is a pinion 134 which drivingly engages the segmental internal gear 135 formed on the arcuate cam plate slide 136 whereby said slide may be rapidly moved by motor 95 or slowly moved by motor 94 in the arcuate guideways 137, 138, and 139 in the housing 11.

At some of the work stations turning tool actuating mechanism is provided for feeding cutting tools longitudinally of the axis of spindle rotation. At other work stations forming tool actuating mechanism is provided for feeding cutting tools perpendicular to the axis of spindle rotation.

In this particular exemplary embodiment, in which the lathe is shown applied to machining crankshafts, the work stations one, five, and seven are arranged for turning operations, Figures III, IV, VI, IX, XVIII, XXII, and XXIV. A description of the tool actuating mechanism of work station one will suffice also for stations five and seven as the mechanism is substantially the same for all turning stations. On the cam plate slide 136 is mounted a bracket 140 by suitable bolts 141 to which are fixed cams 142 and 143 forming an appropriate feed cam track 144 for the roller 145 mounted on the stud 146 fixed in the axially movable rod 147. A bracket 148 secured to the housing 11 by bolts 149 has a half bearing 150 to properly steady the upper end of the rod 147 with its roller properly engaged between the cams 142 and 143, the bracket 148 also serving to maintain the slide 136 in the guideways 137, 138, and 139. The rod 147 is further guided for axial movement in the bushing 151 fixed in the housing 11 and projecting in the slot 151a in the slide 136, and in bushings 152, 153, 154 and 155 in the frame 9.

Securely clamped to the rod 147 by suitable means 156 are the tool holder supports 157 and 158 which carry the respective tool holders 159 and 160 for the turning tools 161, 162, 163, 164, and 165. By loosening the clamping means 156 the tool holder supports 157 and 158 may be swung about the rod 147 through a substantial arc thus bringing the cutting tools away from cutting position for convenience in checking and replacing said tools.

In order to maintain the tool holder support in proper cutting position for the tools, a hardened shoe 166 is secured to the support 157, Figure IX, by screws 167 which abuts against and is free to slide along a hardened strip 168 secured to the frame 9. A clamp 169 mounted in a slot 170 formed in the frame 9 has a projecting end surface 171 which lightly engages the surface 172 of the shoe 166 when the wingnut 173 threaded on the stud 174 fixed in clamp 169 is tightened against the surface 175 of the frame 9 to thereby maintain the tool holder support 157 in proper cutting position. The stud 174 passes through the slot 176 so that upon loosening the wingnut 173 and sliding the stud 174 and clamp 169 in slot 170 to the left, Figure IX, the tool holder support 157, when the clamping means 156 is loosened, may be swung from cutting position for access to the tools.

The work stations two, three, four, and six are arranged for forming operations, Figures III, IV, VII, VIII, XIX, XX, XXI and XXIII. A description of the tool actuating mechanism of work station two will suffice also for stations three, four, and six as the mechanism is substantially the same for all forming stations. Fixed to the cam plate slide 136 is the cam plate 177 by screws 178 to which are fastened the cams 179 and 180 which form an appropriate cam slot 181 for the roller 182 carried on the stud 183 fixed to the outer end of the lever arm 184. The lever arm 184 is free to swung through a substantial arc in the slot 185 of the slide 136, the lever arm 184 having a hub portion 186 securely fixed to the upper end 187 of the rock shaft 188 by a pin 189.

The rock shaft 188, journaled in bearings 190, 191, 192, 193, 194, and 195 in the frame 10, has a series of integral pinions 196, 197, and 198 formed thereon. Forming tool holder supports 199, 200, and 201 are pivotally mounted on bearings 202, 203, and 204 about the rock shaft 188 adjacent the respective associated pinions 196, 197, and 198, whereby the tool holder supports may be swung to or from cutting position for access to the cutting tools. Means are provided for maintaining said tool holder supports in cutting position comprising an eye-bolt 205, Figure VIII, pivotally mounted on the pin 206 fixed in the support 200 and adapted to be swung into or out of a slot 207 in the frame 10 and having a wing-nut 208 threaded thereon which may be tightened down against the surface 209 of the frame 10 to securely hold the surfaces 210 of the support 200 in firm contact with the surface 211 of the frame 10. By loosening the wing-nut 208 and swinging the eye bolt 205 out of the slot 207 the tool holder support 200 may be swung from cutting position for access to the tools.

The forming tools 212, 213, 214, 215, 216, and 217, Figures VII and VIII, are appropriately mounted on the respective tool holders 218, 219, 220 slideably mounted in the respective tool holder supports 199, 200, and 201. Mounted in suitable recesses 221 in the tool holders 218, 219, and 220 are the respective racks 222, 223, and 224 which are drivingly engaged by the respective pinions 196, 197, and 198.

The racks may be adjusted longitudinally of the tool holders and maintained in such adjusted position by means of the hollow screw 225 threaded in the tool holders through which passes a bolt 226 threaded in the racks, particularly shown in Figure VIII. By slightly backing-off the bolt 226 and rotating the hollow screw 225 the rack 223 may be adjusted relative to the tool holder 219 thereby providing means for setting each tool holder independently for properly positioning the cutting tools relative to the work C without effecting the position of the rock shaft 188 and its associated mechanism. Tightening the bolt 226 locks the screw 225 and rack 223 in adjusted position.

It is thus apparent from the above description that by operating the motors 94 and 95 in proper sequence the arcuate cam plate slide 136 can be slowly or rapidly moved in its arcuate guideways 137, 138, and 139 to move the turning station cams 142 and 143 for axially moving shaft 147 for actuating turning tools and the forming station cams 179 and 180 to rock the shaft 188 for actuating the forming tools in feed or rapid traverse movements.

*Work loading and unloading mechanism*

Associated with the loading station is a pair of loading and unloading cranes 227 and 228 each capable of loading and unloading work vertically into and out of the center drive work spindles. Usually in the operation of the lathe one of the cranes, for instance the crane 227, is utilized for inserting unfinished work pieces C into the spindles while the other crane 228 is utilized for unloading the finished work pieces.

Noting particularly Figures X and XI, each crane comprises a vertical cylinder 229 fixed at its lower end in a bracket 230 on upright supports 231 and 232, by suitable bolts 233, which supports are appropriately fastened to the base 1 and upper housing 11 of the lathe. A piston 234 reciprocatable in the cylinder 229 is fastened on the piston rod 235 by a suitable pin 236, the rod 235 being supported for both axial and rotary movement in conventional packing glands 237 and 238 at each end of the cylinder 229. On the gland 237 is mounted a thrust bearing 239 which supports the swinging reel housing 240. The piston rod 235 passes into the bore 241 in the reel housing 240 and has connected to its upper end the rack bar 242 also axially slideable in the bore 241, the rack bar 242 having its upper end passing through the bore 243 in the bracket 244 fixed on the upper housing 11 by screws 245 to give added support to the upper end of the crane.

On the shaft 246 fixed in the reel housing 240 by pin 247 is rotatably mounted the pinion 248, which is driven by the rack 249 formed on the rack bar 242, having an integral flanged portion 250 to which is secured the cable reel 251 by bolts 252. The lifting cable 253 is attached to the reel 251 and passes over and downward from the pulley 254 rotatably mounted on the stud 255 fixed in the reel housing 240 and has connected to its outer end the work gripping device 256.

Fluid pressure from the pump 40a may be directed to either cylinder chamber 257 or 258 of the cylinder 229 through lines 229a and 229b, Figure XI for raising or lowering the piston 234 and its associated rod 235 by properly manipulating the lever 259 of the control valve 260. It can be seen that when fluid pressure is applied in chamber 257 the rod 235 will be moved downward and cause the cable 253 to wind up on the reel 251 thereby raising the work gripping device 256 and that when fluid pressure is applied in chamber 258 the rod 235 will be raised causing the cable 251 to unwind from the reel 251 and lower the work gripping device 256.

The piston rod 235 projects downwardly beyond the gland 238 and has its outer end steadied in a bracket 261 fastened to the upright 231 or 232. The downward movement of the rod 235 is limited by the surface 262 of the piston 234 striking the surface 263 of the bracket 230 thus bringing the work gripping device 256 to proper "up" position for swinging the cranes in the paths 227a and 228a, with work C supported thereon, to or from the work spindle in the loading station.

When the crane is swung outward from the work spindle to be loaded the downward position of the work gripping device is limited by the surface 264 of the piston 234 striking the surface 265 of the body portion 266 of the gland 237 thereby permitting the work gripping device 256 to travel sufficiently far downward to pick up work off of the operation floor 293.

When the crane is swung inward over the work spindle to be loaded the downward travel of work gripping device is limited by the dog 267 fixed on the rod 235 which strikes the plunger 268 of the control valve 260 tripping the valve to neutral position. The dog 267 is so arranged as to automatically cause the work held in the gripping device 256 to be deposited in proper axial position for chucking in the center drive chucking devices. A cutaway portion 269 renders the dog 267 ineffective when the crane is swung outward from the work spindle.

The structure of the work gripping device 256, particularly shown in Figures XII and XIII, comprises a socket 270 having a suitable connection 271 with the cable 253. The yoke 272 has a stem 273 which slidably fits in the bore 274 in the lower end of the socket 270 and is supported at its upper end by a washer 275 slidable in the bore 276 in the socket 270. A pin 277 prevents the washer from coming off the end of the stem 273. Tongues 278 formed integral with the washer 275 slidably fit in the slots 279 in the socket 270 to limit travel of the washer in the bore 276. A spring 280 bearing against the surface 281 of the socket 270 and the surface 282 of the washer 275 supports the yoke 272 and all weight imposed thereon the purpose of which is to permit limited axial movement of the yoke relative to the cable 253 when finally positioning work in the work spindle.

On the yoke 272 is formed an integral ring 283 having serrated jaws 284 carried therein which contact the end, as for example the stub end 285 of the crankshaft C. A movable eccentric serrated jaw 286 pivotally mounted on a pin 287 carried in the ring 283 also contacts the stub end 285 and maintains engagement of all of said serrated jaws with the work C. A handle 288 serves to initially engage or release the work from the serrated jaws 284 and 286. A spring urged plunger 289 in the stem 273 bearing against the surface 290 serves to automatically cause initial engagement of the serrated jaws with the work when the ring 283 is placed over the end of the work piece or crankshaft C.

*Coolant supply and chip disposal*

Referring particularly to Figures II, V, and XV, the coolant supply 291 for the cutting tools at the work spindles of the lathe is maintained in the combined coolant reservoir and chip compartment 292 provided in the operating floor 293 and partly under the base 1 of the lathe. The coolant 291 is pumped from the compartment 292 to the cutting tools by the coolant pump 294 which is driven by the motor 87 which drives the frequency changer 86.

The coolant 291 from the cutting tools carries the chips 295 downwardly to the inclined surface 296 of the pedestals 52 from which the chips are washed by the coolant into the annular chip and coolant trough 297 formed in the base 1. One or more chip scrapers 298 fixed to the indexing carrier 2 travel around in the trough 297 upon indexing of the carrier and conduct the chips, deposited in the trough from the various work spindles, to the discharge opening 299 of the trough 297, through which the chips 295 drop into the compartment 292. A screen 300 in the compartment 292 strains the chips from contact with the coolant pump 294 and provides a suitable inclined surface up which the chips 295 may be scraped when the recess doors are opened.

*Machining method*

The method of machining work pieces, as for example the line bearings and associated surfaces of crankshafts, is particularly shown in Figures XVII to XXIV, inclusive. Figure XVII shows a crankshaft C at the loading station showing the rough surface 302 which is machined away to produce the finished surfaces of the line bearings 303, 304, and 305; stub end 285; gear fit 307; flange 308; oil groove 309; and the associated cheeks 310, 311, 312, and 313 of the line bearings 303, 304, and 305.

The crankshaft C is indexed from the loading station to station one, Figure XVIII, at which tool 161 finish turns a portion of the stub end 285 to accurate dimension; tool 162 rough turns a portion 315 of the stub end 285; tool 163 finish turns the portion 316 of the line bearing 303; tool 164 rough turns a portion 317 surrounding the oil groove 309; and tool 165 rough turns the outside diameter 318 of the flange 308. During the above machining operations the work spindle at station one is rotated at relatively high speed for efficiency in the turning operations here undertaken.

At station two, Figure XIX, forming tool 212 finish faces the cheek 310; tool 213 finish faces the cheek 311; tool 214 finish faces the cheek 312; and tool 215 finish faces the cheek 313, all of said tools machining down to the outside diameter of the respective fillets 319, 320, 321, and 322. The tool 216 rough faces the inside face 323 of the flanges 308; and the tool 217 rough faces the outside face 324 of the flange 308. The work spindle at this station two is operated at variable speed in order to maintain constant cutting speed of the forming or facing tools on the work surfaces being here machined.

At station three, Figure XX, tool 325 faces the end 326 of the stub end 285; tool 327 rough forms the portion 328 on the gear fit 307; tool 329 rough forms the portion 330 on the line bearing 303; tool 331 rough forms the portion 332 and tool 333 rough forms the portion 334 on the line bearing 304; tool 335 rough forms the portion 336 and tool 337 rough forms the portion 338 on the line bearing 305; tool 339 rough forms the portion 340 of the oil groove 309; and tool 341 finish chamfers the portion 342 on the flange 308. The work spindle at this station three is operated at relative slow speed for elimination of chatter in the forming operations.

At station four, Figure XXI, tool 343 rough forms the portion 344 of the gear fit 307; tool 345 rough forms the portion 346 of the fillet 319; tool 347 rough forms the portion 348 of the fillet 320; tool 349 rough forms the portion 350 of the fillet 321; tool 351 rough forms the portion 352 of the fillet 322; tool 353 rough forms the portion 354 adjacent the oil groove 309; and the tool 355 finish forms the oil groove 309. Spindle rotation at this station is at a relatively slow rate for these forming operations.

At station five, Figure XXII, the tool 356 finish turns an additional amount of the stub end portion 314 beginning at position 356a; tool 357 turns an additional amount of the portion 315 on the gear fit 307 beginning at position 357a; tool 358 rough turns an additional amount 302 of the portion 330 of the line bearing 303 beginning at position 358a; tool 359 rough turns the portion 302 of the line bearing 304 between the portions 332 and 334 beginning at position 359a; tool 360 rough turns the portion 302 of the line bearing 305 between the portions 336 and 338 beginning at position 360a; the tool 361 turns off the oil slinger 362 adjacent the oil groove 309; and the tool 363 finish turns the diameter of the flange 308. Relatively rapid spindle rotation is utilized at this station.

At station six, Figure XXIII, the tool 364 chamfers the stub end 285; the tool 365 finish forms the fillet 366 between the stub end 285 and gear fit 307; the tool 367 finish forms the fillet and chamfers the line bearing 303 adjacent the gear fit 307; the tool 368 finish forms the fillet 319 of line bearing 303; the tools 369 and 370 finish form the fillets 320 and 321 of the line bearing 304; the tools 371 and 372 finish forms the fillet 322 and the portion 354 of the line bearing 305; and the tools 373 and 374 finish the faces of the flange 308. Relatively slow spindle speed is used for this spindle.

At station seven, the final work station, Figure XXIV, the tools 375, 376, and 377 beginning at the respective positions 375a, 376a, and 377a finish turn the remaining rough turned portions of the respective line bearings 303, 304, and 305; and the tool 378 finish turns the outside diameter of the oil groove 309 adjacent the flange 308.

It can thus be seen that this lathe is adapted to progressively machine a series of work pieces or crankshafts at a series of work stations at which the spindles may be rotated at the same, different, or variable rates of speed at the various work stations during machining operations.

The machine is also adapted to simultaneously partially rough and partially finish machine work pieces at one or more of the work stations of the machine.

Having fully set forth and described our invention, what we claim as new and desire to secure by United States Letters Patent is:

1. In a multiple spindle machine tool, a base, a rotatable carrier member mounted on said base, a plurality of vertically arranged center drive work spindles each comprising at least one center drive ring chuck and at least one center mounted on said member, tool means and a loading station associated with said work spindles, means mounted on said base for axially adjusting the center of a work spindle at said loading station, and means for rotating said carrier member and rotating said work spindles.

2. In a multiple spindle machine tool, a rotatable carrier member, a plurality of work spindles mounted on said member each comprising a center drive ring gear chucking device, an electric driving motor, and transmission mechanism connecting said motor to said ring gear whereby said chucking device may be rotated, and means for rotating said carrier member.

3. In a multiple spindle machine tool, a rotatable carrier member, a plurality of work spindles mounted on said member each comprising a plurality of center drive ring gear chucking devices, an electric driving motor, and transmission mechanism connecting said motor to said ring gears whereby said chucking devices may be rotated in synchronism, and means for rotating said carrier member.

4. In a multiple spindle machine tool, a rotatable carrier member, a plurality of work spindles mounted on said member each comprising a rotatable work holder and an electric motor for rotating said work holder, means for rotating said motors of said work spindles in synchronism comprising a source of constant frequency electrical energy and means for distributing said energy to all of said motors, and means for rotating said carrier member.

5. In a multiple spindle machine tool, a rotatable carrier member a plurality of work spindles mounted on said member each comprising a rotatable work holder and an electric motor for rotating said motors of said work spindles at predetermined different speeds comprising a source of electrical energy having predetermined different frequencies and means for distributing said frequencies to said motors, and means for rotating said carrier member.

6. In a multiple spindle machine tool, a rotatable carrier member, a plurality of work spindles mounted on said member each comprising a rotatable work holder and an electric motor for rotating said work holder, tool means and a loading station associated with said spindles, means for rotating said carrier member, a source of electrical energy, means for distributing said energy to said motors for rotating said spindles whereby said energy is automatically cut off from said motor of a work spindle at said loading station as said carrier member is rotated, and means independent of said distributing means for applying electrical energy to said motor of said work spindle at the loading station for arresting rotation of or inching said spindle at the work station.

7. In a multiple spindle lathe, an indexing carrier member, a plurality of work spindles mounted on said member each comprising a rotatable work holder and an electric motor for rotating said work holder, a series of work stations associated with said spindles, means for indexing said carrier, a source of electrical energy adapted to operate said motors at a plurality of predetermined different speeds, and means for distributing said energy to said motors to cause the motors to rotate the spindles at the work stations at a predetermined speed for each work station.

8. In a multiple spindle lathe, an indexing carrier member, a plurality of work spindles mounted on said member each comprising a rotatable work holder and an electric motor for rotating said work holder, a series of work stations associated with said spindles, means for indexing said carrier, a source of electrical energy adapted to operate said motors at a plurality of predetermined different speeds, and means operable by the indexing of said carrier member for distributing said energy to said motors to cause the motors to rotate the spindles at the work stations at a predetermined speed for each work station.

9. In a multiple spindle lathe, a frame, an indexing carrier rotatably mounted on said frame, means for indexing said carrier, a plurality of work spindles mounted on said member each comprising a rotatable work holder and an electric motor for rotating said work holder, a series of work stations and a loading station associated with said spindles, a source of electrical energy adapted to operate said motors, and means for distributing said energy to said motors comprising collector rings mounted on said frame consisting of a series of independently energizable segments at least one for each work station and said loading station, means connecting said source of energy to said segments, and collecting means associated with each work spindle and cooperating with said collector rings to convey said energy to said motors.

10. In a multiple spindle lathe, a frame, an indexing carrier rotatably mounted on said frame, means for indexing said carrier, a plurality of work spindles mounted on said member each comprising a rotatable work holder, a series of work stations associated with said spindles, a source of electrical energy consisting of a frequency changer from which may be obtained a plurality of electric currents of different frequencies, means for distributing said energy to said motors comprising collector rings mounted on said frame consisting of a series of independently energizable segments at least one for each work station, collecting means associated with each work spindle and cooperating with said collector rings to convey energy to said motors, and means connecting said electric currents of different frequencies to said segments whereby each spindle may be rotated at predetermined speeds for each work station.

11. In a multiple spindle lathe, a frame, an indexing carrier rotatably mounted on said frame, means for indexing said carrier, a plurality of work spindles mounted on said member each comprising a rotatable work holder, a series of work stations associated with said spindles, a source of electrical energy capable of operating said motors at a plurality of predetermined different speeds, a source of electrical energy capable of operating said motors at variable speeds, means for distributing said energy to said motors comprising collector rings mounted on said frame consisting of a series of independently energizable segments at least one for each work station, collecting means associated with each work spindle and cooperating with said collector rings to convey energy to said motors, and means connecting said sources of electrical energy to said segments whereby said spindles may be rotated at predetermined different speeds at some of said work stations and at variable speeds at others of said work stations.

12. In a multiple spindle lathe, a plurality of work stations each having cutting tools and work spindles associated with said stations, means for supporting said tools in cutting position, means for feeding said tools relative to said work spindles, and means for moving said supporting means away from said spindles to provide access to said cutting tools.

13. In a multiple spindle lathe, a plurality of work stations each having cutting tools and work spindles associated with said stations means for supporting said tools in cutting position, means for feeding the tools at some of said work stations longitudinally of the axis of rotation of said work spindles and the tools at other of said work stations perpendicular to the axis of rotation of said work spindles, and means for moving said supporting means away from said spindles to provide access to said cutting tools.

14. In a multiple spindle lathe, a plurality of work stations each having cutting tools and work spindles associated with said stations, means for supporting turning tools at some of said stations and forming tools at others of said stations, means to cause relative feeding of said tools and said work spindles, means for moving said supporting means away from said spindles to provide access to said cutting tools, and means for independently adjusting said forming tools relative to said work spindles.

15. In a multiple spindle machine tool, a base, a rotatable carrier member mounted on said base, a series of work spindles mounted on said carrier member, means for rotating said carrier member, tool means associated with said work spindles, a chip and coolant collecting trough in said base surrounding said carrier member, a downwardly extending discharge opening in said trough, one or more chip scrapers mounted on said carrier member operating in said trough whereby rotation of said carrier member causes chips deposited in said trough from said work spindles to be disposed of through said discharge opening, and a receptacle under said base adapted to receive the off-fall from said discharge opening.

16. In a multiple spindle crakshaft lathe adapted to machine the line bearings and associated portions of crankshafts, a plurality of work spindles each adapted to support and rotate a crankshaft intermediate its ends, a series of work stations associated with said work spindles, and means for progressively presenting said crankshafts in said spindles to said work stations whereby at one of said stations combined rough an finish turning operations are performed, at a second station cheeking and facing operations are performed, at a third station rough forming operations are performed, at a fourth station rough necking and finish forming operations are performed, at a fifth station combined rough and finish turning operations are performed, at a sixth station finish forming and facing operations are performed, and at a seventh station finish turning operations are performed.

17. In a multiple spindle lathe, a rotatable carrier member, a series of vertical work spindles each having a center drive chucking device and a center mounted on the carrier member, means for loading work pieces downwardly in said chucking device and on said center, tools located at indexed stages adapted to engage work pieces held in the chucking devices, means for rotating the carrier member selectively to said stages, and means for rotating the chucking devices at said stages.

18. In multiple spindle lathe, a rotatable carrier member, a series of verticle work spindles each having an electric driving motor and comprising a center drive chucking device and a center mounted on the carrier member, means for vertically loading and unloading work in said spindles, tools located at indexed stages adapted to engage work pieces held in the chucking devices, means for rotating the carrier member selectively to said stages, and means for rotating the chucking devices at said stages.

19. In a multiple spindle lathe, a carrier rotatable on a vertical axis, a series of vertical work spindles mounted on said member each comprising a center drive ring gear chucking device, an electric driving motor, and transmission mechanism connecting said motor to said ring gear whereby said chucking device may be rotated, and means for rotating said carrier member.

20. In a multiple spindle lathe, a carrier rotatable on a vertical axis, a series of vertical work spindles mounted on said member each comprising a plurality of center drive ring gear chucking devices, an electric driving motor, and transmission mechanism connecting said motor to said ring gears whereby said chucking devices may be rotateed in synchronism, and means for rotating said carrier member.

21. In a multiple spindle lathe, a frame, a rotatable carrier member mounted on said frame, a series of work spindles mounted on said member, cutting tools mounted on said frame at indexed stages adapted to engage work pieces held in said work spindles at variable feeding rates, means for rotating said carrier member selectively to said stages, and means for rotating the chucking devices at said stages at variable speeds synchronized with the variable feeding rates of said tools.

22. In a multiple spindle lathe, a frame, a rotatable carrier member mounted on said frame, a series of work spindles mounted on said member, cutting tools mounted on said frame at indexed stages adapted to engage work pieces held in said work spindles, means for rotating said carrier member selectively to said stages, a source of power associated with each spindle, means for controlling said sources of power so as to rotate said spindles at a plurality of variable speeds during rotation of said carrier member, and means for feeding said tools at a plurality of variable rates.

23. In a multiple spindle lathe, a frame, a rotatable carrier member mounted on said frame, a series of work spindles mounted on said member, cutting tools mounted on said frame at indexed stages adapted to engage work pieces held in said work spindles, means for rotating said carrier member selevtively to said stages, a source of power associated with each spindle, means for controlling said sources of power so as to rotate said spindles at a plurality of variable speeds, and means for feeding said tools.

24. In a multiple spindle lathe, a frame, a rotatable carrier member mounted on said frame, a series of work spindles mounted on said member, cutting tools mounted on said frame at indexed stages adapted to engage work pieces held in said work spindles, means for rotating said carrier member selectively to said stages, a source of power associated with each spindle, means for controlling said sources of power so as to rotate some of said spindles at substantially the same speed, others of said spindles at a plurality of different speeds, and still others at a plurality of variable speeds, and means for feeding said tools.

25. In a multiple spindle lathe, a frame, a rotatable carrier member mounted on said frame, a series of work spindles mounted on said member, cutting tools mounted on said frame at indexed stages adapted to engage work pieces held in said work spindles, means for rotating said carrier member selectively to said stages, a source of power associated with each spindle, means for controlling said source of power so as to rotate some of said spindles at substantially the same speed, some of said spindles at a plurality of different speeds, and some of said spindles at a plurality of variable speeds, and to arrest from rotation still others of said spindles, and means for feeding said tools.

26. In a multiple spindle lathe, a base, an indexing carrier member mounted on said base for movement in a horizontal plane, a series of pedestals mounted on said carrier member, vertically arranged center drive chucking devices mounted on said pedestals, electric driving motors carried by said pedestals, transmission mechanism connecting said motors to said chucking devices, cutting tools mounted on said base at a series of work stations, means for indexing said carrier for moving said chucking devices to said work stations, and means to cause relative feeding of said cutting tools and said chucking devices.

27. In a multiple spindle lathe, a base, an indexing carrier member mounted on said base for movement in a horizontal plane, a series of pedestals mounted on said carrier member, vertically arranged center drive chucking devices mounted on said pedestals, centers mounted in said pedestals, transmission mechanism connecting said motor to said chucking devices, cutting tools mounted on said base at a series of work stations, means for indexing said carrier for moving said chucking devices and centers to said work stations, and means to cause relative feeding of said cutting tools and said chucking devices and centers.

28. In a multiple spindle lathe, a base, an indexing carrier member mounted on said base for movement in a horizontal plane, a series of pedestals mounted on said carrier member, center drive chucking devices mounted on said pedestals, means for vertically loading and unloading work pieces in said chucking devices, means for rotating said chucking devices, cutting tools mounted on said base at a series of work stations, means for indexing said carrier for moving said chucking devices to said work stations, and means to cause relative feeding of said cutting tools and said chucking devices.

29. In a lathe, a frame, a vertically arranged center drive chucking device mounted on said frame, driving means mounted on said frame, transmission gearing connecting said driving means to said chucking device whereby it may be rotated, cutting tools mounted on said frame, means for feeding said cutting tools relative to said chucking device, and means associated with said chucking device whereby work may be loaded or unloaded from said chucking device from a position vertically above said device.

30. In a lathe, a frame, a vertically arranged center drive chucking device mounted on said frame, driving means mounted on said frame, transmission gearing connecting said driving means to said chucking device whereby it may be rotated, a vertically positioned center mounted on said frame below said chucking device, cutting tools mounted on said frame, means for feeding said cutting tools relative to said chucking device, and means associated with said chucking device and center whereby work may be loaded or unloaded from said chucking device from a position vertically above said device.

31. In a multiple spindle lathe, a frame, a rotatable carrier member mounted on said frame, one or more vertically arranged center drive chucking devices mounted on said carrier member, driving means connected to said chucking devices whereby they may be rotated, cutting tools associated with said chucking devices, means for feeding said cutting tools relative to said chucking devices, and means associated with said chucking devices whereby work may be loaded or unloaded from said devices from a position vertically above said devices.

32. In a multiple spindle lathe, a frame, an indexing carrier member mounted on said frame, a plurality of work spindles on said carrier member each comprising a center drive chucking device, a series of work stations and a loading station arranged on said frame, means for indexing said carrier member to said stations, cutting tools at said work stations, means for feeding said cutting tools relative to said work spindles, and means mounted on said frame and associated with a work spindle at the loading station whereby work may be loaded or unloaded from said devices from a position vertically above said devices.

33. In a multiple spindle crankshaft lathe, a frame, a carrier rotatable on said frame, a plurality of work spindles on said carrier each comprising center drive chucking mechanism adapted to support and rotate a crankshaft intermediate its ends, a plurality of work stations mounted on said frame, cutting tools at said work stations means for moving said carrier to progressively present said work spindles to said work stations, and means for feeding said cutting tools at said stations so that the tools at some of said stations perform turning operations on portions of said crankshafts, the tools at other of said stations perform cheeking operations on webs of said crankshafts, and the tools at still other of said stations perform forming operations on portions of said crankshafts.

34. In a multiple spindle crankshaft lathe, a frame, a carrier rotatable on said frame, a plurality of work spindles on said carrier each comprising center drive chucking mechanism adapted to support and rotate a crankshaft intermediate its ends, a plurality of work stations mounted on said frame, cutting tools at said work stations, means for moving said carrier to progressively present said work spindles to said work stations, and means for feeding said cutting tools at said stations so that the tools at some of said stations perform rough turning operations and the tools at other of said stations perform finish turning operations on said crankshafts.

35. In a multiple sipndle crankshaft lathe, a frame, a carrier rotatable on said frame, a plurality of work spindles on said carrier each comprising center drive chucking mechanism adapted to support and rotate a crankshaft intermediate its ends, a plurality of work stations mounted on said frame, cutting tools at said work stations, means for moving said carrier to progressively present said work spindles to said work stations, and means for feeding said cutting tools at said stations so that the tools at some of said stations perform rough forming operations and the tools at other of said stations perform finish forming operations on said crankshafts.

36. In a multiple spindle cranckshaft lathe, a frame, a carrier rotatable on said frame, a plurality of work spindles on said carrier each comprising center drive chucking mechanism adapted to support and rotate a cranckshaft intermediate its ends, a plurality of work stations mounted on said frame, cutting tools at said work stations, means for moving said carrier to progressively present said work spindles to said work stations, and means for feeding said cutting tools at said stations so that the tools at some of said stations perform combined rough and finish turning operations and the tools at other of said stations perform finish forming operations on said crankshafts.

37. In a crankshaft lathe, a base, a work carrier movably mounted on said base, means on said carrier to vertically support and revolve a plurality of crankshafts intermediate their ends, a series of work stations and a loading station provided on said base, tool feeding devices at said work stations and operable to feed appropriate tools for machining the stub end, the flange end, and all of the line bearings of said crankshafts, means for moving said carrier to selectively present said supporting and revolving means to said stations, and means at said loading station for vertically inserting or withdrawing a crankshaft axially of a work spindle thereat.

38. In a lathe, a frame, a vertically arranged center drive chucking device mounted on said frame, driving means mounted on said frame, transmission gearing connecting said driving means to said chucking device whereby it may be rotated, cutting tools mounted on said frame, means for feeding said cutting tools relative to said chucking device, and means associated with said chucking device whereby work may be loaded in said chucking device to a definite axial position from a position vertically above said device.

39. In a lathe, a frame, a vertically arranged center drive chucking device mounted on said frame, driving means mounted on said frame, transmission gearing connecting said driving means to said chucking device whereby it may be rotated, cutting tools mounted on said frame, means for feeding said cutting tools relative to said chucking device, and means associated with said chucking device whereby work may be loaded in said chucking device to a definite axial position from a definite position vertically above said device.

40. In a lathe, a frame, a vertically arranged center drive chucking device mounted on said frame, driving means mounted on said frame, transmission gearing connecting said driving means to said chucking device whereby it may be rotated, cutting tools mounted on said frame, means for feeding said cutting tools relative to said chucking device, means associated with said chucking device whereby work may be loaded in said chucking device to a definite axial position from a definite position vertically above said device, and means associated with said last mentioned means whereby said work may be lowered to a definite position outside said chucking device from said position vertically above said device.

41. In a lathe, a frame, a vertically arranged center drive chucking device mounted on said frame, driving means mounted on said frame, transmission gearing connecting said driving means to said chucking device whereby it may be rotated, cutting tools mounted on said frame, means for feeding said cutting tools relative to said chucking device, and a pair of work handling devices associated with said chucking device, each of said work handling devices being adapted to load or unload work from said chucking device from a position vertically above said device.

42. In a lathe, a frame, a vertically arranged center drive chucking device mounted on said frame, driving means mounted on said frame, transmission gearing connecting said driving means to said chucking device whereby it may be rotated, cutting tools mounted on said frame, means for feeding said cutting tools relative to said chucking device, means associated with said chucking device whereby work may be loaded in said chucking device to a definite axial position from a position vertically above said device, and means connected to said last mentioned means providing limited relative movement of said work piece to said center drive chucking device, and said last mentioned means.

43. In a multiple spindle lathe, a series of work stations and a loading station, a rotatable carrier member, a series of work spindles mounted on said carrier member, means for rotating said carrier member so as to present said spindles to said work stations and loading station, means for at all times continuously rotating said spindles when they are at said work stations and when said carrier member is moving them from one work station to another, and means for stopping rotation of said spindles and starting them up again as they are carried by said carrier member from a work station through the loading station to another work station.

44. In a multiple spindle lathe, a series of work stations and a loading station, a rotatable carrier member, a series of work spindles mounted on said carrier member, means for rotating said carrier member so as to present said spindles to said work stations and loading station, means for at all times continuously rotating said spindles when they are at said work stations and when said carrier member is moving them from one work station to another, means for stopping rotation of said spindles when brought into said loading station, and means for intermittently actuating said spindles when at said loading station.

45. In a crankshaft lathe, a bed, a work carrier mounted for horizontal movement on said bed, means on said carrier to vertically support and revolve a plurality of crankshafts intermediate their ends, tool feeding devices mounted on said bed at indexed stages and operable to feed appropriate tools for machining the stub end and also the flange end of said crankshafts, further tool feeding means also mounted on said bed for machining all of the line bearings of said crankshafts, and means for moving said carrier selectively to said stages.

46. In a crankshaft lathe, having a bed, means on said bed to vertically support and revolve a plurality of crankshafts intermediate their ends, said supporting means being horizontally movable to present said crankshaft successively to various work stages, tool feeding devices located at said various stages, and means for operating said tool feeding devices to cause relative feeding of said tool feeding devices and said crankshafts, certain of said tool feeding means being simultaneously operable at at least one of such stages for machining the stub end, the flange end and all of the line bearings of said crankshafts thereat.

47. In a multiple spindle crankshaft lathe, a base, a rotatable carrier member mounted on said base, a plurality of vertically arranged work spindles each comprising chucking mechanism for vertically supporting and rotating crankshafts to be machined, tool means and a loading station associated with said work spindles, means for rotating said spindles, and means for moving said carrier so as to successively present said work spindles to said tool means and loading station.

48. In a multiple spindle crankshaft lathe, a base, a rotatable carrier member mounted on said base, a plurality of vertically arranged center drive work spindles each having chucking mechanism adapted to vertically support and rotate a crankshaft by means of its webs, tool means and a loading station associated with said work spindles, means for rotating said spindles, and means for moving said carrier so as to successively present said work spindles to said tool means and loading station.

49. In a center drive crankshaft lathe, a base, a rotatable carrier member mounted on said base, a plurality of vertically arranged work spindles each comprising chucking mechanism for supporting and rotating crankshafts with their line bearing portions exposed for machining, tool means for machining said portions and a loading station associated with said work spindles, means for rotating said spindles, and means for moving said carrier so as to successively present said work spindles to said tool means and loading station.

50. In a machine tool adapted to machine bearing portions of a crankshaft, a base, a rotatable carrier member mounted on said base, a plurality of vertically arranged work spindles each comprising chucking mechanism for supporting and rotating crankshafts to be machined, tool means and a loading station associated with said work spindles, means for effecting relative feeding of said bearing portions and said tool means, means for rotating said spindles, and means for moving said carrier so as to successively present said work spindles to said tool means and loading station.

51. In a machine tool adapted to machine bearing portions of a crankshaft, a base, a rotatable carrier member mounted on said base, a plurality of vertically arranged work spindles each comprising chucking mechanism for supporting and rotating crankshafts to be machined, centers associated with said chucking mechanism for steadying the ends of the crankshafts, tool means and a loading station associated with said work spindles, means for effecting relative feeding of said bearing portions and said tool means, means for rotating said spindles, and means for moving said carrier so as to successively present said work spindles to said tool means and loading station.

52. In a machine tool adapted to machine bearing portions of a crankshaft, a base, a rotatable carrier member mounted on said base, means on said carrier member for supporting and rotating crankshafts free from axial displacement caused by the effect of gravity and overall weight of the crankshaft comprising a plurality of vertically arranged work spindles having chucking mechanism for gripping a crankshaft without axially distorting it, tool means and a loading station associated with said work spindles, means for effecting relative horizontal and vertical feeding of said tool means and said portions of the crankshafts, means for rotating said spindles, and means for moving said carrier so as to successively present said work spindles to said tool means and loading station.

WILLIAM F. GROENE.
HAROLD J. SIEKMANN.
WALTER R. MEYER.